S. H. MENZIES.
TREATMENT OF WATER, SEWAGE, AND THE LIKE.
APPLICATION FILED SEPT. 27, 1916.
1,229,305.
Patented June 12, 1917.
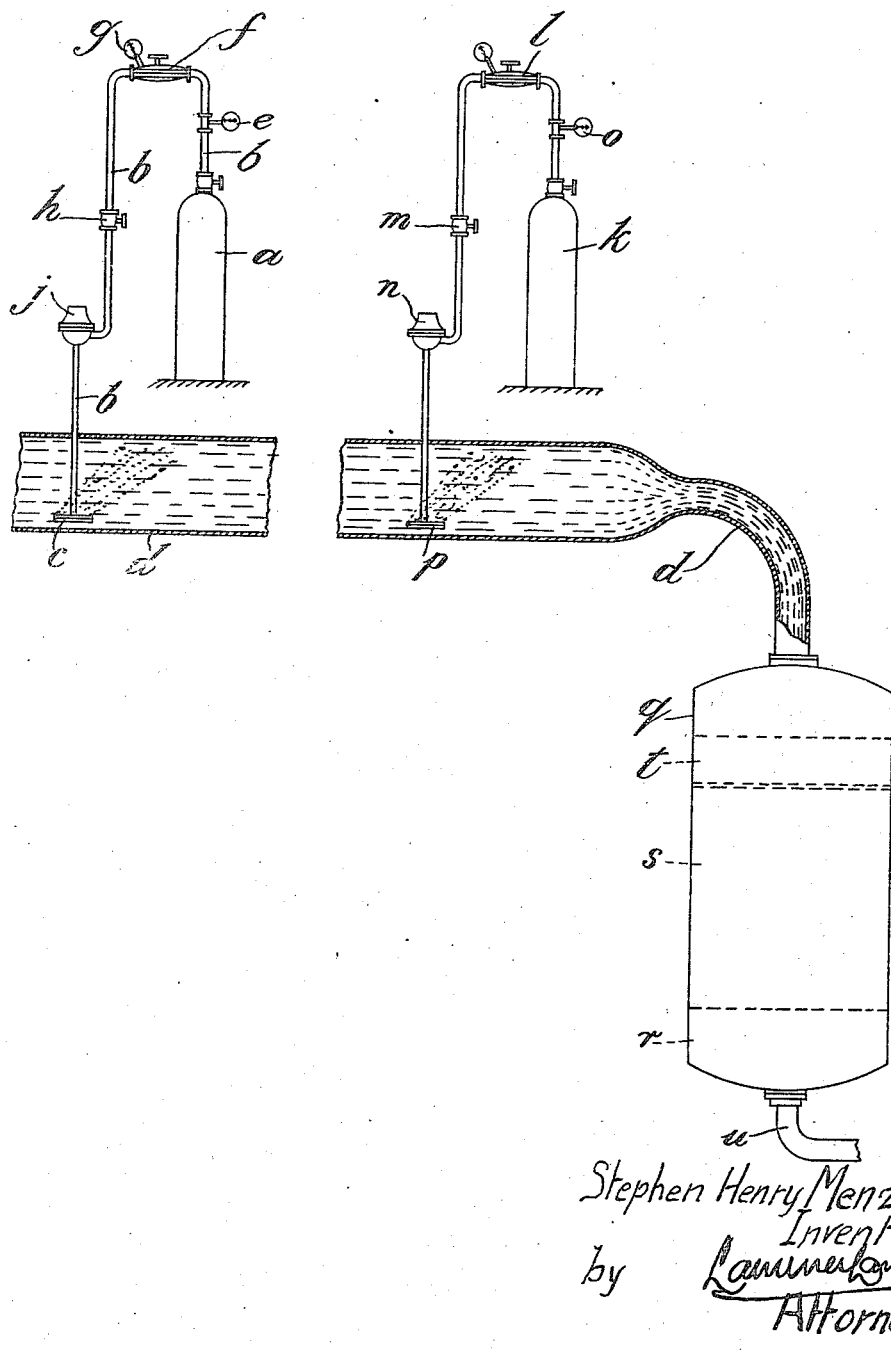
Stephen Henry Menzies
Inventor
by Lammer Longuet
Attorney.

UNITED STATES PATENT OFFICE.

STEPHEN HENRY MENZIES, OF LONDON, ENGLAND.

TREATMENT OF WATER, SEWAGE, AND THE LIKE.

1,229,305.  Specification of Letters Patent.  Patented June 12, 1917.

Application filed September 27, 1916. Serial No. 122,412.

*To all whom it may concern:*

Be it known that I, STEPHEN HENRY MENZIES, a subject of the King of Great Britain, and residing at Imperial House, Kingsway, London, England, have invented certain new and useful Improvements Relating to the Treatment of Water, Sewage, and the like, of which the following is a specification.

This invention relates to the treatment of water, sewage and so forth for the purpose of sterilizing it and then making it suitable for general purposes and for drinking. The chlorination of water, sewage and the like is a well known process of sterilizing, the chlorin being passed directly into the water, or a strong solution of chlorin gas in water being made, which solution is afterward mixed with the water to be sterilized. In order to insure that the sterilization is complete it is necessary to employ an excess of chlorin, and it is desirable subsequently to remove that excess before the water is used.

It is one object of this invention to enable this excess of chlorin to be eliminated by means of a gas, so that the flow can be accurately controlled and the amount of the gaseous reagent used can be kept constant in accordance with the amount of free chlorin to be neutralized. A further advantage of the use of a gas for dechlorinating is that both the chlorin gas and the dechlorinating gas can be allowed to flow through the water as the water flows continuously. The desired result can be attained by the use of a gas in a lower state of oxidation, for example sulfur dioxid, which can be compressed in cylinders and the rate of outflow of which can be accurately controlled. The gas can be passed into the chlorinated water, sewage or the like through a diffuser consisting for example of plates of spongy carborundum which allow the gas only to flow in a very fine state of subdivision so that it is evenly distributed through the water.

After this treatment the water when sterilized, and containing no free chlorin, can be further improved, particularly for drinking purposes, by restoring it to a normal well oxygenated condition. It is a further object of the present invention to effect this while the water flows continuously through the system, and this can be attained if, after the dechlorinating treatment, the water is passed at once through an apparatus of a known type for treating water with manganese permutit. This substance, manganese permutit, when used for oxygenating water, normally requires the addition of a salt in a lower state of oxidation, to render it active. It is now found that the sulfur dioxid gas already in the water after its dechlorinating treatment is sufficient to render active the manganese permutit, so that no further addition thereto is required, and the water after the dechlorinating can flow directly to the apparatus containing the manganese permutit.

In order to explain the reactions which take place, it will be sufficient to mention that the free chlorin remaining in solution in the water has an affinity for hydrogen, tending to form hydrochloric acid therewith, while the sulfur dioxid gas has an affinity for oxygen, tending to form sulfuric acid. The hydrogen and oxygen required are obtained from the water therefore with the formation of hydrochloric and sulfuric acid, when the sulfur dioxid comes into contact with the aqueous solution of chlorin. The acids when formed are doubtless immediately neutralized by reaction with carbonates of lime, magnesia and the like which are always present in the water treated, and no noticeable acidity is found in the water after the treatment. The sulfur dioxid gas, however, also tends to take up any free oxygen absorbed in the water in order to form sulfuric acid, and it is well known that water from which all absorbed oxygen has been removed is "flat" for drinking purposes. It is for this reason that some further operation for reoxygenating the water is desirable if it is to be used for drinking purposes after the treatment with chlorin and then with a gas such as sulfur dioxid, as above set forth.

In the accompanying drawing is illustrated diagrammatically an installation for treating water, sewage and so forth according to the present invention.

In carrying the invention into effect the chlorinating of the water may be effected by any known process according to which chlorin gas is discharged into the water. The chlorin is preferably contained in a cylinder $a$ from which it passes through a line of piping $b$ to a diffuser $c$ consisting for example of plates of spongy carborundum. The diffuser $c$ is suitably arranged in a pipe $d$ through which the water to be treated passes. In the line of piping $b$ are arranged a pressure gage e for indicating the pressure of the chlorin leaving the cylinder a, and a reducing valve f which is adapted to be set to suit the conditions of working and which is provided at its discharge end with a gage g so that the pressure at which it is adjusted may be ascertained. A cut-off valve h and a check valve j are also arranged in the piping.

The subsequent treatment of the water for the removal of free chlorin by means of a gas in a lower state of oxidation, such as sulfur dioxid gas may be effected in a similar apparatus. The gas is ready prepared and supplied in the form of a liquid in cylinders such as k from which it is allowed to flow as required, and its rate of flow can be accurately measured and controlled, by means of the reducing valve l, cut-off valve m, check valve n and gage o. It may flow direct into the water or the like to be treated through a diffuser p as stated, while the rate of flow of the water is also known or accurately determined. In order to determine the amount of the dechlorinating gas required any suitable test may be employed; for instance samples of the chlorinated water may be taken, and the dechlorinating gas may be added thereto until there is no free chlorin as determined by a test such as the known starch test. An excess of the gas may be used beyond the amount so determined, in order to insure that there is no free chlorin under any circumstances, and if desired to render reoxygenation by permutit, effective. The rate of flow of the sulfur dioxid gas when once set, will be practically constant until the supply from a gas cylinder k is exhausted, when another is readily connected in order to continue the supply The apparatus q for reoxygenating the water may be of any known type such as is employed for treating water with permutit, and manganese permutit may be used, this being revivified when required by potassium permanganate in the known manner. The pipe d in which the water has already been treated with chlorin and sulfur dioxid gas enters the upper end of the manganese permutit filter q which contains a layer of sand r, a layer of manganese permutit s and another layer of sand t. The treated water passes out of the bottom of the filter q through a pipe u from which it may be drawn for use or collected in tanks and so forth for subsequent use as may be required. It is a matter of importance that the reoxygenating agent used should act effectively in the presence of some of the sulfur dioxid employed for dechlorinating. Manganese permutit when used for the direct treatment of water requires the addition of a ferrous salt, or other salt in a lower state of oxidation, in order to render it active. It is an advantage of the present process that the sulfur dioxid gas not only does not hinder the effectiveness of the manganese permutit, but renders it active so that the use of the ferrous or other salt is not essential.

It will be seen that by the process above set forth it is possible to treat water, sewage and so forth continuously as it flows through a plant wherein it is successively chlorinated, then dechlorinated, and finally reoxygenated. It is possible to regulate each of the operations accurately to avoid waste, and to eliminate in a large measure the risks of error due to the human element which arises when solutions of salts have to be prepared of the correct strength, and added to the water. The flow of gases, when once correctly determined, can be maintained continuously and without risk of error.

Having thus described my invention what I claim as new and desire to secure by Letters Patent is:—

1. A process for the treatment of water, sewage and so forth consisting in diffusing chlorin in the water and subsequently removing any free excess of chlorin by the diffusion into the water of a gas in a low state of oxidation.

2. A process for the treatment of water, sewage and so forth consisting in diffusing chlorin in the water and subsequently removing any free excess of chlorin by the diffusion into the water of sulfur dioxid gas.

3. A process for the treatment of water, sewage and so forth consisting in passing free chlorin into the water, then diffusing into the water thus treated an excess of sulfur dioxid gas to remove any free chlorin, and then passing the water through an oxygenating agent.

4. A process for the treatment of water, sewage and so forth, consisting in passing chlorin into the water, removing free chlorin therefrom by the diffusion into the water of sulfur dioxid gas and then reoxygenating the water by passing it through manganese permutit.

STEPHEN HENRY MENZIES.